United States Patent

Conn et al.

[15] 3,697,886

[45] Oct. 10, 1972

[54] SOLID STATE RADIO FREQUENCY VOLTAGE CONTROLLED OSCILLATOR, POWER AMPLIFIER AND DIRECT CURRENT POWER SUPPLY

[72] Inventors: James B. Conn; J. Richard Delbauve; Hugh Lilienkamp, all of Indianapolis, Ind.

[73] Assignee: The United States of America as represented by the Secretary of tthe Navy

[22] Filed: Nov. 8, 1971

[21] Appl. No.: 196,286

[52] U.S. Cl. ....................331/69, 325/119, 325/184, 331/74, 331/117

[51] Int. Cl. ..............................................H03b 1/00

[58] Field of Search ...........331/69, 70; 325/119, 184

[56] References Cited

UNITED STATES PATENTS 3,287,658 11/1966 Sulzer..........................331/69

*Primary Examiner*—John Kominski
*Attorney*—R. S. Sciascia and P. S. Collignon

[57] ABSTRACT

A combination radio frequency (RF) voltage-controlled oscillator (VCO), RF power amplifier, and direct current (DC) to DC converter power supply all comprised of solid state circuits which generate an RF which is stable in frequency and power over a wide operating temperature range, and which generates DC voltages for use both within the combination and externally to the combination. The VCO has a modulation frequency response of DC to 2 megahertz (MHz) and modulation sensitivity of 1 to 2 MHz per volt D. C.

5 Claims, 2 Drawing Figures

SOLID STATE RADIO FREQUENCY VOLTAGE CONTROLLED OSCILLATOR, POWER AMPLIFIER AND DIRECT CURRENT POWER SUPPLY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Many, if not most, of the solid state RF power devices developed prior to this use a chain of frequency multipliers to achieve the output frequency and power of which the unit is capable. The multiplier approach often results in a unit which is more difficult to align, less efficient, less stable in frequency vs. temperature, less reliable, and larger in volume than the unit described herein. These disadvantages are believed to be overcome in the circuit of this invention.

SUMMARY OF THE INVENTION

In the present invention a VCO and power amplifier are supplied regulated voltages from a DC to DC converter source which invention, in combination with the heater control circuit, also regulates the current through heaters in the VCO and power amplifier to control operating temperature. The DC to DC converter providing the regulated power supply operates at an inverter switching frequency of between 1 to 2 kilohertz (KHz), and care has been taken to electrically isolate or shield the inverter and filter sections from the regulator section. The isolation and low inverter frequency preclude the possibility of undesirably high amplitude, high frequency radiated and conducted spiking voltages due to the switching action of the inverter section. Electronic circuits in close proximity to the switching source could be very susceptible to the radiated spiking. The lower switching rate tends to decrease the susceptability to spiking. The input feedback current presents another problem in the design of the DC to DC power supplies. Extensive filtering is employed on the input to the inverter section to reduce this feedback current to acceptable values. The power supply must be capable of delivering the required power and also dissipate the power loss due to low efficiency. The procedures followed in the design are basic but strict component requirements must be met in order to successfully dissipate the power in the packaging volume desired or available. The VCO section employs a solid-state free-running fundamental frequency RF oscillator with a frequency stability of ±0.1 percent maximum over a −40° to +71° C. operating temperature range. The power amplifier is similarly stable and is isolated from the VCO by an isolator circuit. The output of the power amplifier is also fed through an isolator circuit to a point of use. Accordingly, it is a general object of this invention to provide a VCO and RF power amplifier combination that is temperature compensated and stable over a prescribed frequency.

BRIEF DESCRIPTION OF THE DRAWINGS

These and other objects and the attendant advantages, features, and uses will become more apparent as a more detailed description proceeds when considered along with the accompanying drawings, in which.

DESCRIPTION OF THE PREFERRED EMBODIMENT

Figure 1:
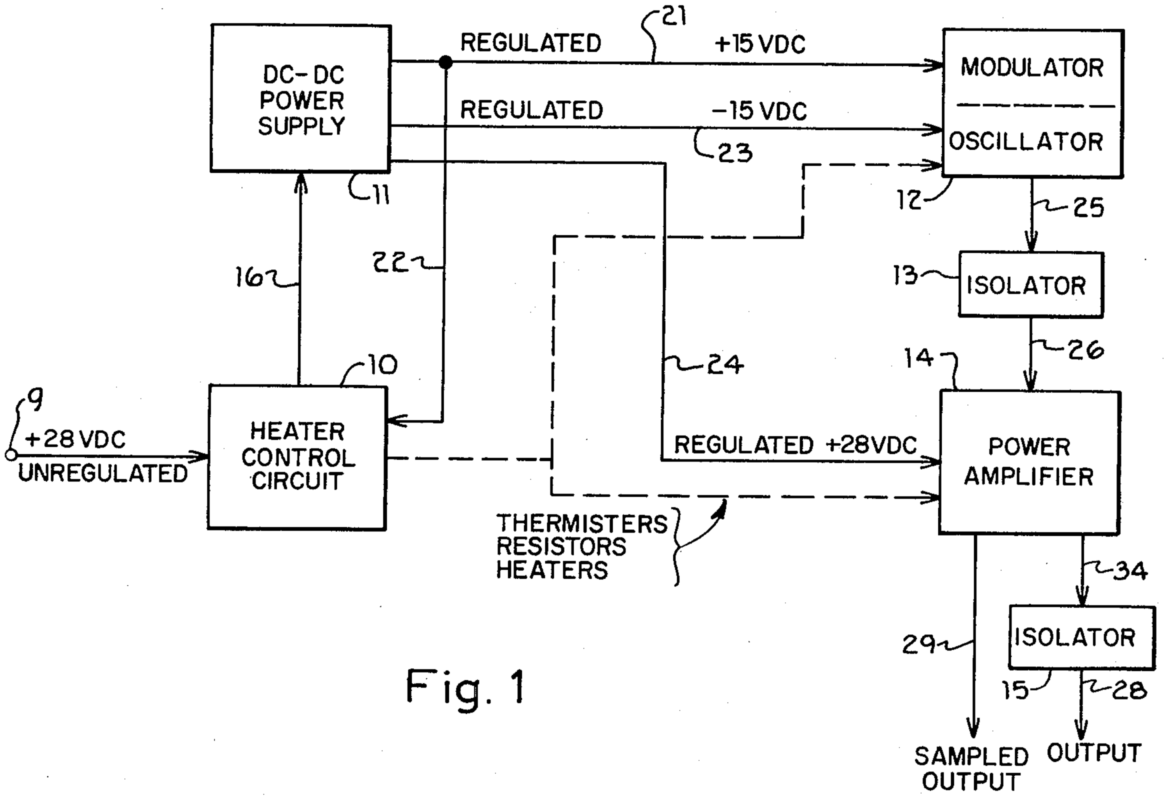
FIG. 1 is a block circuit schematic of the invention combination.

Referring more particularly to FIG. 1 a voltage source 9, such as that from an aircraft electrical system of 28 VDC, is an unregulated voltage source applied through a heater control circuit 10 by way of conductor means 16 to a DC-to-DC converter power supply 11 to produce regulated voltage outputs. The regulated voltage outputs 21 and 23 are applied to a modulator and RF oscillator combination 12 to produce a free running variation of radio frequency with any center frequency range 1,760 to 1,850 MHz band with a frequency stability of ±0.1 percent over a temperature range of −40° to 71° C. The oscillator is voltage controlled and can be modulated by a frequency of DC to 2 MHz and has a modulation sensitivity of 1 Mhz per volt DC. The RF oscillations from the oscillator 12 are conducted through an isolator 13 to a power amplifier 14 which is supplied regulated voltage DC by a conductor means 24 from the regulated DC-to-DC converter 11 to produce the above stated frequency band through an isolator 15 to an output 28 for use in the order to 2 to 2.5 watts. The heater control circuit 10 is coupled to heaters and thermistors in the modulator and oscillator circuit 12 and also in the power amplifier 14 to provide a maximum range of operation from −40° to +71° C. base plate operating temperature.

Figure 2:
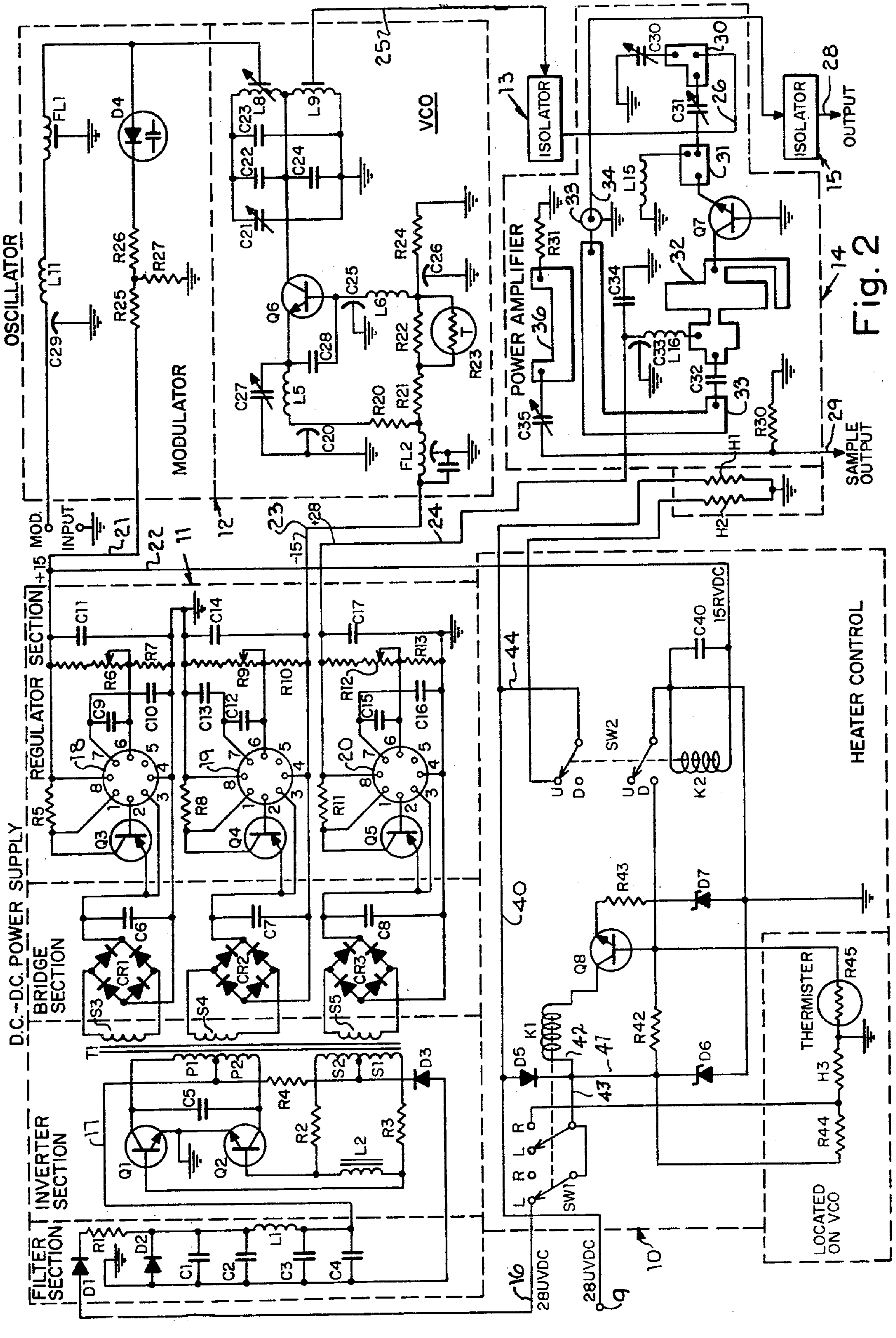
FIG. 2 is a circuit schematic, partially in block, of the circuit combination of FIG. 1.

Referring more particularly to FIg. 2 the DC-to-DC converter power supply 11 is made up of four sections, namely: a filter section, an inverter section, a bridge section, and a regulator section. The DC-to-DC converter receives the 28 volts unregulated DC, as hereinabove stated, over conductor means 16 which may be unregulated to ±10 percent VDC. This voltage is applied through the filter section to the inverter section by way of the diode D1, resistor R1 and inductance L1 by way of conductor means 17. The diode D1 provides reverse polarity protection while the resistor R1 and a diode D2 provide protection against transients generated by the power source. Capacitors C1 through C4 and the inductance L1 provide a filter network to attenuate the input feedback current generated by the inverter section. The ground side of the filter circuit is also coupled by D3 to the inverter section through the resistor R4 and conductor 17. The inverter section includes 2 NPN transistors Q1 and Q2 having their emitters coupled in common to ground and their collectors coupled across the primary windings P1 and P2 of a transformer T1. The base electrodes of Q1 and Q2 are coupled across the secondary windings S1 and S2 of T1 through resistors R2 and R3. A saturable inductance L2 is coupled across the base terminals of Q1 and Q2 and a capacitor C5 is coupled across the collectors of Q1 and Q2. The input conductor 17 to the inverter section is to a center tap on the primary of transformer T1 and the junction of the diode D3 and resistor R4 is center tapped to the secondary S1,S2 of the transformer T1. Upon the application of voltage to the inverter section, Q1 will be driven into a conductive state by the positive voltage developed by R3 and the transformer T1 feedback secondary winding S1. As the saturable inductor L2 saturates it shorts out the voltage applied to the base of transistor Q1. When this occurs, Q1 loses its drive and turns "off" to a nonconductive state. The magnetization current of the transformer T1 reverses the feedback voltages in S1 and S2 and brings Q2 towards conduction. As soon as L2 comes out of saturation the positive feedback is effective and the second cycle is begun. R4 and D3 make up the starting circuit for the inverter. The capacitor C5 is used to protect the transistors from exceeding their collector breakdown voltage. The output on the secondaries S1 through S5 of transformer T1 is a square wave at an established frequency prearranged to be herein, for the purpose of an example of operation, as 1,300 Hz. The outputs of the secondaries S3, S4, and S5 are inputs to the bridge section.

The first bridge CR1 of the bridge section is coupled across the secondary S3, the bridge section CR1 constituting a bridge rectifier having the output taken from the opposite corners of CR1 constituting the input to the regulator. The rectifier bridge CR1 has a capacitor C6 across the output terminals to reduce the spiking and ripple contained on the output which, for the purpose of example herein, will be expressed as 22 VDC. The bridge rectifiers CR2 and CR3 are coupled respectively to the secondaries S4 and S5 to produce direct current voltage outputs to the regulator section in like manner as that described for the bridge rectifier CR1. In like manner capacitors C7 and C8 are coupled across the output terminals of the bridge section to reduce the spiking and ripple voltages. The output from the bridge rectifier CR2 provides a +22 VDC. The output of the bridge rectifier CR3 differs from that of CR1 and CR2 only in producing a higher voltage from an increased number of turns on the secondary S5 to provide for a voltage such as 36 VDC, used for an example herein.

The output of the bridge rectifier CR1 provides an input to the first regulator section being to the emitter of a transistor control element Q3. The collector of transistor Q3 is coupled through a current regulating resistor R5 to its output branch conductors 21 and 22. The base of transistor Q3 is coupled to the terminal 2 of an integrated circuit voltage regulator 18 produced by the National Semiconductor Company under the product number LM105. Terminal 7 of the voltage regulator 18 is capacitor coupled by C9 to the terminal 6, the latter terminal being coupled to the center tap of the potentiometer R6 coupled in a series of resistors between the output circuit 21, 22 and the common ground of the bridge section and terminal 4 of the regulator 18. A capacitor C10 is also coupled between terminal 7 and the common ground. The output 21,22 has a capacitor C11 in parallel to the ground terminal. Voltage regulation is performed by comparing a sample of the output voltage with a reference and any error present is amplified and used to control a series control element, herein being the transistor Q3 by a coupling to the base terminal from terminal 2 of 18. The sample element is represented by the voltage divider network R6, R7 while capacitors C9, C10, and C11 are used to stabilize and reduce the ripple and spiking of the regulator output. The potentiometer R6 is used to adjust the output to the required voltage, herein shown for the purpose of example as being +15 volts. The regulator section having transistor Q4 and voltage regulator 19 and companion circuitry is substantially the same as that shown and described for the regulator section used in the transistor Q3 and voltage regulator 18 circuit except that the output from the collector terminal is grounded herein and the opposite terminal output 23 is utilized producing, for the purpose of example herein, a −15 VDC. In like manner Q5 and 20 with the related circuitry is a regulator section to produce on its output 24 a +28 VDC in the same manner as described for the first regulator section. All three voltage regulators 18, 19, and 20 are integrated circuits produced by the National Semiconductor Company under the designation LM105 and further discussion of these elements will not be made herein.

The output 21 from the regulator section is conducted as an input to the modulator section of the oscillator or VCO circuit 12. Conductor 21 is coupled in series through resistors R25,R26 and a diode D4 as an input to the oscillator section. The modulator input is through a capacitor C29, inductive reactance L11 and filter FL1 to the input of the oscillator section. One plate of the capacitor C29 is coupled to ground and the filter FL1 is capacitive coupled as an RF bypass to ground. The output 23 from the second regulator section is coupled as an input through the filter FL2, resistor R20 and inductor L5 to the emitter of a transistor oscillator Q6. The VCO is built around a Fairchild MT 1050 coaxial NPN transistor Q6. The collector makes contact with a resonator rod of INVAR steel and is thus at DC ground. The resonator rod has capacitors C21 through C24 and inductors L8 and L9 connected therewith. The base electrode of Q6 is RF bypassed to ground through a capacitor C25 and is DC coupled through the inductor L6 to the junction of resistors R22 and R24 with a thermistor R23 coupled in parallel with R22. The junction of the low-pass line filter FL2 and resistor R20 is coupled through a resistor R21 in series with the parallel coupling of R22 and R23. RF frequency is bypassed to ground through the capacitOr C26 at the junction of resistors R22 and R24, the end lead of R24 being grounded. In like manner an RF bypass capacitor C20 is coupled to the junction of R20 and L5 to ground; this point is also coupled through a variable capacitor C27 to the emitter with the emitter and base terminals coupled through a capacitor C28. The frequency of oscillation is determined primarily by the resonator rod which is less than a quarter wavelength long at the output frequency. At 1,850 MHz a wavelength is approximately 16 centimeters long. Hence, the resonator rod is something less than 4 centimeters long. Tuning is accomplished basically by varying the amount of capacitance at the rod open end by adjusting the variable capacitor C21. This varies the effective electrical length of the rod. The feedback required to sustain oscillation is supplied through the transistor Q6 collector-emitter junction capacitance in conjunction with the portion of the resonator rod between ground and the collector, and the parallel combination of C27 and C28. Since there is no inherent phase shift from input to output in the common-base configuration, the feedback voltage must be supplied to the emitter with essentially zero phase shift at the frequency of operation. This is accomplished by adjusting capacitor C27.

A transistor semiconductor junction possesses two types of capacitances: transition capacitance ($C_T$) and diffusion capacitance ($C_D$). $C_T$ results from the electrical field produced by the voltage across the transistor junction. Thus $C_T$ is voltage dependent. $C_D$ is due to the current through the junction; hence, $C_D$ is current dependent. The total junction capacitances, i.e., collector-base and base-emitter, are thus the sum of $C_T$ and $C_D$. The collector-base capacitance is primarily comprised of $C_T$ and $C_D$ is small in a reversed bias junction. The base-emitter capacitance consists primarily of $C_D$ since the $C_T$ is small in the forward biased condition. In order to minimize frequency drift caused by transistor junction capacitance change over the operating temperatures, a resistor R22 and thermistor R23 bias scheme is used. The collector-to-base junction capacitance shunts a portion of the resonator rod while the base-to-emitter capacitance shunts the feedback control capacitors C27 and C28. A change in either of these junction capacitors will alter the output frequency and power. Both the transistor current gain (DC and AC) and base-emitter junction voltage ($V_{BE}$) change with varying operating temperatures. Gain varies directly with temperature and $V_{BE}$ varies inversely with temperature. As the temperature decreases, current gain, hence emitter current, decreases and base-emitter capacitance ($C_{BE}$) decreases. An increase in $V_{BE}$ also causes emitter current to decrease. Hence, the oscillator frequency tends to increase in frequency due to the decrease in $C_{BE}$ resulting from the decreasing operating temperatures. With increased temperature the reverse of the above occurs.

In order to maintain a ±2 MHz maximum frequency drift over temperature, a proportional type of control is employed in the base-emitter bias leg. This is comprised of R21 in series with the parallel combination R22 and R23. The thermistor R23 has a negative temperature coefficient and a logarithmic change in value ($\Delta$R) with temperature ($\Delta$T). With R22 at 60 ohms and r23 at 100 ohms the combination has a nominal resistance of 40.5 ohms at 25° C. As temperature decreases from 25° C. the parallel combination increases from 40.5 ohms toward a final value of approximately 68 ohms. Inversely as the temperature increases above 25° C. the combination approaches a value of approximately 0 ohms. In this way the base-emitter bias voltage developed across R21 in series with R22 and R23 is varied in order to maintain the emitter current nearly constant. Thus, a nearly constant base-emitter capacitance is maintained; i.e., as the temperature increases the voltage across the compensating resistors decrease and the emitter current decreases. Hence the increase in current associated with increase in current gain is compensated and changes in frequency are minimized. Also in case of increase in temperature the voltage drop across the collector-base bias resistor R24 increases thereby lowering the transition capacitance, $C_T$, of the collector-base junction. This tends to increase the oscillating frequency to further compensate for the effect of changing current gain and changing base-emitter voltage. This frequency compensation alone is not adequate to maintain the frequency drift at ±2 MHz maximum over − 40° to +71° C. base plate temperature. The purpose of the VCO heater and heater-control circuit is to extend the frequency stability to −40° C. The description of the heater circuit will follow. The modulator input is applied through an adjustable capacitor coupling to L8 while the output 25 of the VCO is taken by capacitance coupling from L9. The output frequency in the bandwidth of 1,760 to 1,850 MHz is substantially stabilized in center frequency on the output 25 and is coupled through an isolator 13 to the power amplifier 14. The isolator 13 substantially isolates any feedback from the power amplifier to the VCO 12 to avoid any disturbance of the stable frequency generated.

The RF power amplifier provides a nominal 10 db gain at any frequency within the 1,760 MHz to 1,850 MHz band. The output 25 from the VCO through the isolator 13 is applied as input 26 to the power amplifier 14. The input 26 is to a microstripline conductor 30 which is etched from copper-clad laminated material with teflon-glass dielectric. This microstripline conductor 30 is coupled through a variable capacitor C30 to ground and also through a variable capacitor C31 to a microstripline conductor 31. The microstripline conductor 31 is coupled through an inductance L15 to ground and also to the emitter of a power transistor Q7 operating as a Class C amplifier. The base of Q7 is grounded and the collector is coupled to a microstripline conductor 32 and through a capacitor C32 to a microstripline conductor 33. The microstripline conductor 32 is coupled through an inductance L16 to the output conductor 24 from the last regulator section in the DC-to-DC converter supply. The conductor 24 is coupled to one plate of a capacitor C34, the opposite plate of which is grounded. The conductor 24 is also coupled through an RF bypass capacitor C33 to ground. The input microstripline conductors 30 and 31 have the proper characteristic impedance and length to match the transistor emitter input impedance, and capacitance C30 and C31 are variable to accomplish matching over the 1,760 and 1,850 MHz band. The transistor output impedance at the Q6 collector end of microstripline 32 is matched to 50 ohms by means of the reactive microstrip transmission line in parallel with the output and a short step "Chebyshev" broadband impedance transformer 32 in series with the output to the output capacitor C32. The short step "Chebyshev" broadband impedance transformer is of the type shown and described in the publication IEEE Transactions On Microwave Theory and Techniques, Vol. MTT-14, No. 8, for August 1966, pages 372 to 383. The open end of the microstripoline in parallel with the transistor Q7 collector transforms to a short circuit a quarter wavelength away from the open end and is inductive between a quarter wavelength and a half wavelength at 1,850 MHz. The length of this line is between a quarter and a half wavelength thus at the transistor Q7 collector the line provides an inductive reactance which conjugately matches the transistor output capacitance. The "Chebyshev" transformer then provides a broadband transformation of the transistor class C output resistance to an output impedance of 50 ohms. The broadband impedance transforming network consists of short lengths one-sixteenths wavelength at 1,850 MHz) of relatively high characteristic impedance transmission line alternating with short lengths of relatively low impedance line. Since this type of matching circuit provides a wideband match, no tuning adjustments are required on the output. The output 34 is conducted through the isolator 15 providing the output 28 is the order of 2 to 2.5 watts of RF power over the frequency band of 1,760 to 1,850 MHz. A variable 20 to 25 db coupler provided by a microstripline conductor 36 in parallel with the microstripline conductor 33 is provided to produce a sample output of the conductor 29 of approximately 5 to 10 milliwatts of sampled RF power. This power output is variable by the adjustable capacitor C35 developing this power across a resistor R30, the opposite end of the microstripline conductor 36 being coupled through resistor R31 to ground. As in the case of the VCO the power amplifier 14 cannot operate throughout a full temperature range of −40° to +71° C. without some heater assistance. The means of heating the VCO and the power amplifier is described hereinbelow.

The heater control circuit 10 receives the unregulated VDC of, for example, 28 volts from terminal 9 by way of conductor 40 through a diode D5 to branch conductor 41 through a biasing resistor R42 to the base of a switching transistor Q8, through a branch conductor 42 through the electromagnetic coil of a relay switch K1 to the collector of transistor Q8, and through the branch conductor 43 to the switch blades SW1 of a relay K1. At the normal unenergized condition of K1 the left contact L supplies the 28 UVDC over conductor 16 to the filter section of the DC-to-DC power supply 11. The 28 UVDC from terminal 9 is also supplied over conductor 40 through a heater H1 positioned in the power amplifier housing or on its base plate. Conductor 40 is also coupled through a branch conductor 44 through the switch SW2 of the relay K2 upper contact U through a second heater H2, also positioned in the power amplifier housing or on the base plate. The base of transistor Q8 is coupled to the lower contact D of SW2, the lower switch blade of which is coupled to ground. The electromagnetic coil K2 of switch SW2 is coupled to +15 regulated voltage from the output 21 by way of conductor means 22 to supply voltage to the coil K2. The emitter of transistor Q8 is coupled through a biasing resistor R43 and a Zener diode D7 to ground. The junction of resistor R42 and a diode D5 is also coupled to ground through a Zener diode D6. The base of transistor Q8 is coupled through a thermistor R45 to ground and the junction of diodes D5 and D6 is coupled through a resistor R44 and a heater H3 in series to ground. The resistor R44, heater H3, and thermistor R45 are physically located within the housing or on the base plate of the VCO. The resistor R44 may be of the order of 50 ohms while the heater H3 may be of the order of 18 ohms to provide control of the transistor Q8 as hereinafter will be described.

For the purpose of example let it be assumed that the temperature of the VCO and the power amplifier is below −5° C. The thermistor R45 resistance has increased since this thermistor has a high negative temperature coefficient of resistance so that its resistance decreases as temperature rises, and vice versa. Unregulated 28 VDC is applied and current flows through heater H1 all the time. Heater H1 is of the order of 120 ohms. Current will flow through the switch SW2 from the branch conductor 44 and upper contact U through heater H2, being about 60 ohms, because K2 is de-energized at this time. Relay K1 is energized due to the thermistor R45 resistance increasing and biasing Q8 in the conductive state. Current flows through D5, which is used for reversed voltage protection, through the three branch conductors 41, 42, and 43. This current is applied through the right switch contacts of SW1 through the heater H3 to ground. The heat developed by the heater H3 warms the VCO and in turn lowers the resistance of the thermistor R45. This biases Q8 to the nonconductive state and de-energizes relay K1. The current that is at the output of D5 is applied through the resistor R44 and also through the left switch blade of SW1 to the L contact to supply current to the filter section of the DC-to-DC converter supply by way of conductor 16. The regulated +15 VDC is applied by way of conductors 21 and 22 to energize the relay K2 of switch SW2. This applies current potential to the base of transistor Q8 cutting this transistor "off" regardless of the thermistor R45 resistance change at other temperatures. Capacitor C40 is attached to delay the turn-on of relay K2 at low temperatures so that relay K1 can energize first. Resistor R44 is used to reduce the current through the heater H3 when K1 is de-energized. The Zener diode D6 is used to protect Q8 from voltage transients. R42 and R43 are used to bias Q8, and the Zener diode D7 is used to hold the voltage at the emitter of Q8 at a constant value. At temperatures above −5° C., as used herein for an example, the heater control circuit is deactivated and has no roll in the VCO and power supply operation.

OPERATION

In the operation of the device if the temperature is below some predetermined set temperature as −5° C., hereinabove given as an example, the heater control circuit will be operative by virtue of thermistor R45 control of the transistor Q8 to supply heat to the VCO and power amplifier components, as hereinabove stated. Prior to the application of the unregulated VDC to the DC-to-DC converter, after the VCO and power amplifier components 12 and 14 are heated to a temperature above the pre-established value of −5° C., power will be applied to the DC-to-DC converter 11 and this voltage filtered, inverted, rectified, and regulated as hereinabove described for the component 11 to provide the +15 VDC, −15 VDC, and +28 VDC regulated voltages for the modulator VCO, power amplifier, and heater control units. Modulation voltages may be applied to the modulation input to modulate the frequency generated by the VCO component which is stabilized in frequency, as hereinabove described for this component, with a frequency band of 1,760 to 1,850 MHz. The VCO is capable of producing this frequency on its output 25 at a power level of about 200 milliwatts which is amplified in the power amplifier to about 2.5 watts. The power amplifier 14 is isolated by the isolator 15 from any output circuit utilized with the device herein. Where the temperatures is within range of a −5° to 71° C. the heater control circuit is inoperative except that heater H1 is operative directly from the unregulated voltage source 9 and the components 11, 12, and 14, are immediately operative without any heater control circuit operation. In the above described manner the solid-state free-running fundamental frequency oscillator and power amplifier circuit will provide from 2 to 2.5 watts of RF power at a frequency within the 1,760 to 1,850 MHz band. The maximum frequency drift over the −40° to +71° C. base plate operating temperatures was found to be within 2 MHz or approximately 0.1 percent.

While many modifications may be made in the arrangement of parts and in the various voltages and biases to produce different frequencies or frequency band for certain circumstances, or by generating submultiple frequencies and then multiplying these frequencies by varactors or diode multipliers, it is to be understood that we desire to be limited in the spirit of our invention only by the scope of the appended claims.

We claim:

1. A solid state RF voltage-controlled oscillator and power amplifier with a DC-DC converter power supply comprising:

a direct current-to-direct current converter having an input of unregulated voltage and outputs of regulated voltage;

an oscillator of radio frequency having inputs coupled to the outputs of said converter, a modulator input, and an output of stable center frequency;

a power amplifier having an input coupled to the output of said oscillator and an output;

a heater control circuit having an unregulated voltage input and heaters in a switched circuit therewith, said heaters being in the areas of said oscillator and said power amplifier circuits to heat the oscillator and power amplifier circuits during low temperatures; and isolators in the coupling between said oscillator and power amplifier and in the output of said power amplifier whereby the output radio frequency is stabilized over a wide temperature range.

2. A solid state RF voltage-controlled oscillator and power amplifier circuit as set forth in claim 1 wherein said direct current-to-direct current converter includes a filter section, an inverter section, a bridge section and a regulator section in that order from input to output to produce said regulated voltage outputs.

3. A solid state RF voltage-controlled oscillator and power amplifier circuit as set forth in claim 2 wherein said oscillator includes an NPN transistor with the collector thereof coupled to a resonator rod primarily establishing the oscillator frequency.

4. A solid state RF voltage-controlled oscillator and power amplifier circuit as set forth in claim 3 wherein said power amplifier includes a power transistor with microstripline conductors from said input to output, and a microstripline inductive coupling with said microstripline conductor to provide a low power sampled output.

5. A solid state RF voltage-controlled oscillator and power amplifier circuit as set forth in claim 4 wherein said heater control circuit includes a switching transistor and relay coils of relay switches in the emitter-collector circuit thereof with the base in circuit with a thermistor of negative coefficient in the area of said voltage-controlled oscillator, said relay switches being in circuit with said heaters whereby the temperature in the area of said voltage-controlled oscillator operates said thermistor to switch said switching transistor to control heater output.

* * * * *